United States Patent [19]
Persson

[11] 3,905,450
[45] Sept. 16, 1975

[54] METHOD AND APPARATUS OF LUBRICATING SEALING RINGS DISPOSED AXIALLY BETWEEN TWO MACHINE ELEMENTS

[75] Inventor: Bror Arthur Persson, Kvidinge, Sweden

[73] Assignee: Ingvar Valentin Falk, Helsingborg, Sweden

[22] Filed: June 17, 1974

[21] Appl. No.: 479,839

[30] Foreign Application Priority Data
June 19, 1973 Sweden............................ 73085995

[52] U.S. Cl................. 184/6.14; 137/237; 184/1 E; 277/59; 277/177; 285/94; 285/190; 285/DIG. 19
[51] Int. Cl............................................... F01m 9/00
[58] Field of Search............ 184/6.14, 6.16, 7 F, 29, 184/50 R, 54, 1 R, 1 E, 80; 299/81; 285/134, 136, 190, 94, 272, DIG. 19; 277/59, 177; 137/237

[56] References Cited
UNITED STATES PATENTS

| | | | |
|---|---|---|---|
| 1,499,851 | 7/1924 | Brown, Jr. .......................... | 285/190 |
| 2,459,643 | 1/1949 | Hartley .............................. | 285/190 |
| 2,614,793 | 10/1952 | Storm ...................... | 285/DIG. 19 X |
| 2,659,615 | 11/1953 | McClain ............................ | 285/136 |
| 3,186,723 | 6/1965 | Wagner............................... | 277/59 |
| 3,259,392 | 7/1966 | Peickii et al. ...................... | 277/59 |

FOREIGN PATENTS OR APPLICATIONS
6,511,459 9/1965 Netherlands................ 285/DIG. 19

*Primary Examiner*—Richard C. Pinkham
*Assistant Examiner*—Arnold W. Kramer
*Attorney, Agent, or Firm*—Bucknam and Archer

[57] ABSTRACT

A method of lubricating sealing rings by deforming them in an axial sense, which are disposed axially between two machine elements arranged for rotation in relation to each other and about the axis of the sealing rings. A pressure fluid distribution assembly with sealing rings disposed axially between two machine elements arranged for rotation in relation to each other and about the axis of the sealing rings. The sealing rings are placed in grooves with at least one side wall undulated to deform the sealing rings in response to pressure variations in the space between the sealing rings.

17 Claims, 3 Drawing Figures

FIG.2

METHOD AND APPARATUS OF LUBRICATING SEALING RINGS DISPOSED AXIALLY BETWEEN TWO MACHINE ELEMENTS

In different types of machines for working tubular or rod-shaped bodies, e.g. for machining or cutting, extruded plastic pipes or other tubular or rod-shaped bodies which emerge from an extruder or extrusion press, it is desirable that the working element of the tool or tools revolve about the object which is to be worked. To this end, the tool or tools can be mounted on an annular mounting element through which extends the object to be worked and which revolves about the object. If, in this instance, the tool or tools are powered hydraulically or pneumatically and the pressure fluid hoses are connected to the tools mounted on the annular mounting element, said working element cannot be caused to revolve continuously in one direction but must be given a reciprocatory rotation comprising approximately one revolution, since otherwise the pressure fluid hoses would become entangled and twisted. The return movement entails a loss of time and, for this reason, a pressure fluid distributing assembly has been developed in which the pressure fluid is transferred to the tool or tools via a distribution space defined between two sealing rings and located between the annular rotary mounting element and a stationary machine element. In this situation, however, difficulties have arisen with regard to the lubrication of these two sealing rings.

One object of the present invention, therefore, is to obviate these difficulties and to provide a simple and effective method of lubricationg the sealing rings.

Another object of the present invention, is to develop an improved pressure fluid distributing assembly comprising a pair of sealing rings and means for lubricating these sealing rings.

These and other objects of the present invention will appear from the following description with reference to the drawings in which.

Figure 1:
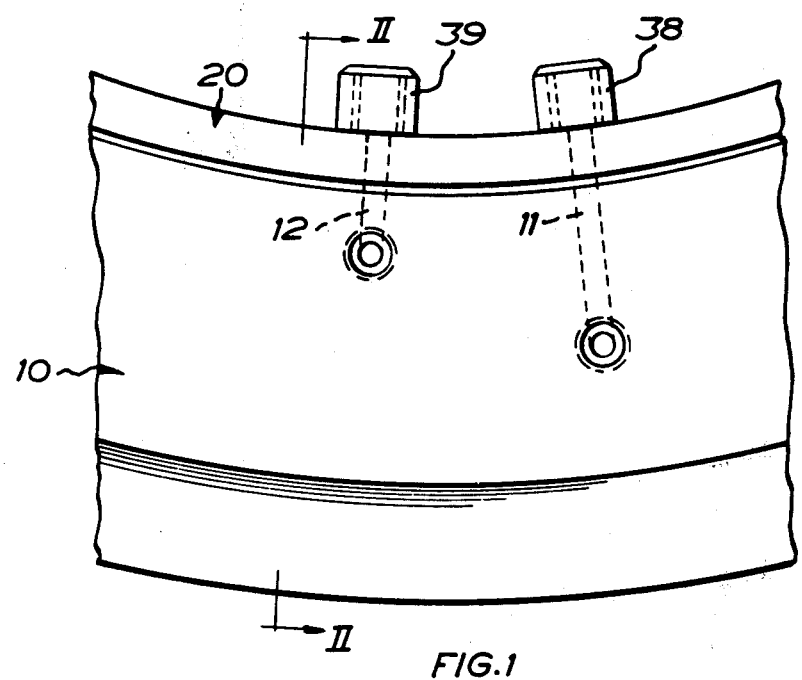
FIG. 1 shows an end elevational view of a portion of an annular stationary jacket and an annular rotary mounting element in one preferred embodiment of the present invention.
Figure 2:
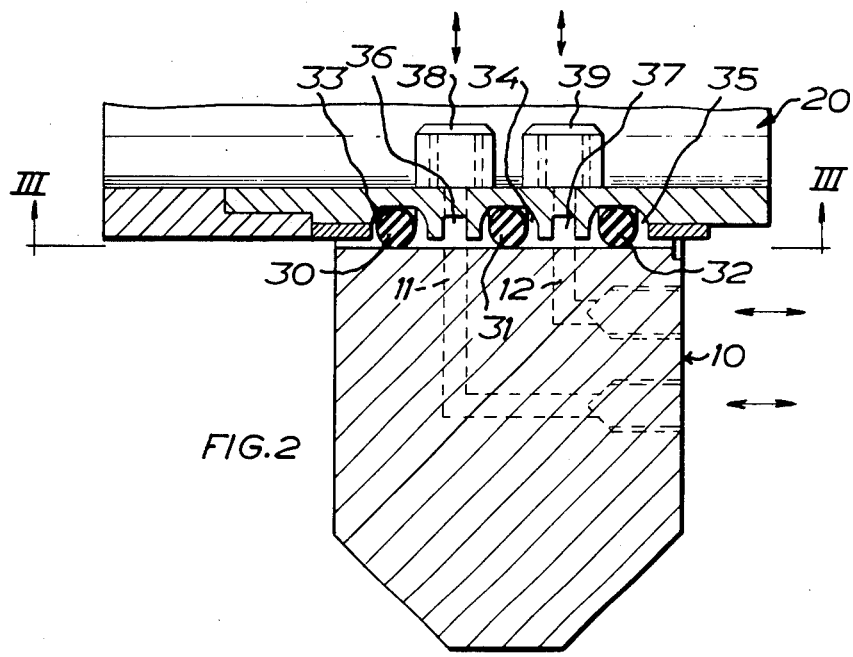
FIG. 2 is a section along the line II—II in FIG. 1.

As will appear from the following description I have invented a new method of lubricating a pair of sealing rings mounted axially beside one another and together defining a pressure fluid distribution space between two machine elements arranged for rotation in relation to each other and about the axis of the sealing rings. This new method comprises the steps of feeding a lubricant into the pressure fluid distribution space, axially displacing the sealing rings at intervals first towards each other and then away from each other, and deforming the sealing rings in an axial sense into a shape deviating from the shape of an annular body of rotation. The axial displacement of the sealing rings is preferably effected by variation of the fluid pressure in the pressure fluid distribution space between the two sealing rings. The variation of the fluid pressure can be a pulsation of the pressure or a pressurisation/depressurisation cycle.

In a preferred embodiment of my new method I lubricate three sealing rings mounted axially beside one another to pairwise define two pressure fluid distribution spaces between two machine elements arranged for rotation in relation to each other and about the axis of the sealing rings. This preferred embodiment of my new method comprises the steps of feeding a lubricant into the pressure fluid distribution spaces; simultaneously axially displacing the sealing rings of one sealing ring pair at intervals first towards each other and then away from each other and the sealing rings of the other sealing ring pair at intervals first away from each other and then towards each other; and deforming the sealing rings in an axial sense into a shape deviating from the shape of an annular body of rotation.

The preferred way of deforming the sealing rings in an axial sense is to press them against a sealing ring groove wall with alternating recesses and projections.

The new pressure fluid distribution assembly according to my invention comprises a pair of sealing rings disposed axially beside one another; two machine elements arranged for rotation in relation to each other and about the axis of said sealing rings, said sealing rings and said two machine elements together defining a pressure fluid distribution space; means defining pressure fluid channels in said two machine elements, said fluid channels opening into the pressure fluid distribution space; groove-defining wall means on one of said two machine elements, said wall means defining annular grooves for said sealing rings; means defining alternating recesses and projections on at least one side wall of each annular groove defined by said groove-defining wall means; means for feeding a lubricant into the pressure fluid distribution space; and means for axially displacing said sealing rings in the grooves defined by said groove-defining wall means to bring said sealing rings into contact with said recess- and projection-defining means for deforming said sealing rings into a shape deviating from the shape of an annular body of rotation.

In a preferred embodiment of my new pressure fluid distribution assembly I use three sealing rings disposed axially beside one another to define two pressure fluid distribution spaces to permit pressure fluid distribution to double-acting hydraulic or pneumatic prime movers.

Referring to the drawings, tools (not shown) are mounted on a ring 10 which is rotatable about a stationary jacket 20. Three sealing rings 30, 31, 32 are disposed between the jacket and the ring 10. These sealing rings are each disposed in their respective annular sealing ring grooves 33, 34, 35 which are formed axially beside one another in the stationary jacket 20. The space between two adjacent sealing rings, i.e. the space between the sealing rings 30 and 31, and that between the sealing rings 31 and 32, respectively, forms a pressure fluid distribution space 36 and 37, respectively. Each of the two pressure fluid distribution spaces comprises a circumferential groove in the jacket 20. Inlet and outlet sockets 38, 39 for connection to pressure fluid supply lines (not shown), open into these circumferential grooves. The inlet and outlet sockets are connected to means for feeding pressure fluid and/or lubricant to the pressure fluid distribution spaces and for varying the fluid pressure in these grooves.

The rotatable ring 10 has inner channels 11, 12 which are each in communication with their respective pressure fluid distribution spaces 36 and 37, so that the pressure fluid can be transferred from this space to the channels 11, 12 independently of the position of rotation of the ring 10. The channels 11, 12 are connected with the tools (not shown) mounted on the ring 10.

Figure 3:
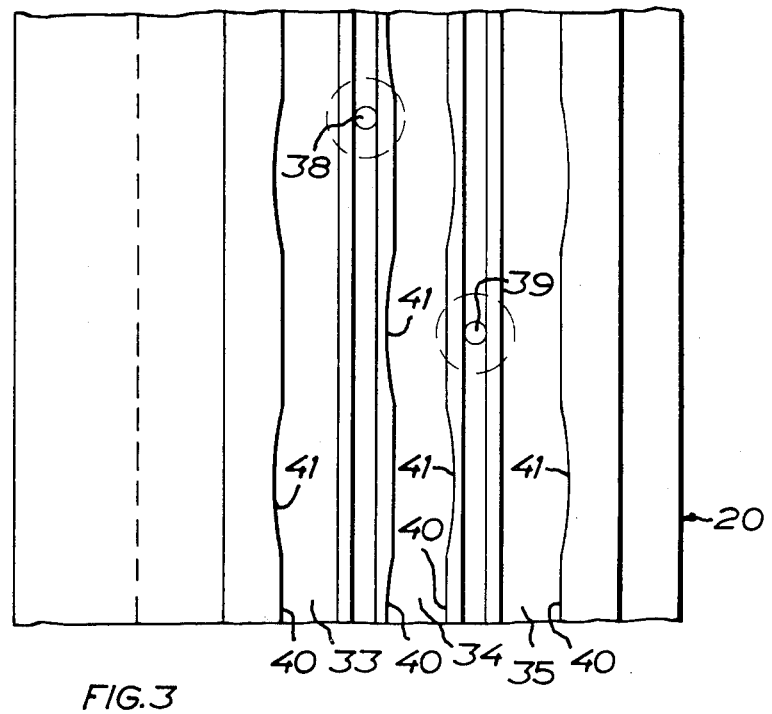
FIG. 3 is a view corresponding to the line III—III in FIG. 2 and illustrates a portion of the annular jacket in a developed state and without sealing rings.

In order to ensure an effective lubrication of the sealing rings 30, 31, 32, at least one side wall of the annular grooves 33, 34, 35 for the sealing rings is undulated or wavelike in form, as is illustrated in FIG. 3. As will be apparent from FIG. 3, one wall 40 of each of the annular grooves 33 and 35 has been formed with recesses 41 so that the wall is wavelike in appearance. In the corresponding manner, both of the side walls 40 in the groove 34 have been provided with recesses 41.

According to the invention lubrication of the sealing rings 30, 31, 32 is effected by axially displacing the sealing rings at intervals, first in one and then in the other direction, thereby deforming the sealing rings in the axial sense into a wavelike or other form deviating from an annular body of rotation when the sealing rings are shifted at least in one direction. This deformation is produced by the recesses 41 in the annular grooves 33, 34, 35. The displacement is achieved by variations in the pressure of the pressure fluid. In the construction shown, pressurising conditions and depressurising conditions alternately prevail in the pressure fluid distribution spaces 36, 37, dependent entirely upon the operating cycles of the powered tools. When pressurising conditions prevail in the pressure fluid distribution space 36, depressurising conditions prevail in the pressure fluid distribution space 37, and vice versa. In order to achieve the lubrication a lubricant is introduced, which can either constitute the pressure fluid itself, or be supplied together with the pressure fluid. When the pressure fluid is air, the lubricant can be supplied in the form of an oil mist. The intentional deformation of the sealing rings, when they come into contact with the wavelike side walls at the pressure changes, ensures that the lubricant is enabled to lubricate all of the surface areas both in the bottoms of the annular grooves and on the sealing surface of the ring 10.

The above is a description of one preferred embodiment in which three sealing rings are disposed axially beside one another in order pairwise to define two pressure fluid distribution spaces. However, it is possible to utilize two rings to define a single pressure fluid distribution space, in which case the tools connected to this space can have single acting pneumatic or hydraulic prime movers.

Experiments have shown that the annular ring grooves 33, 34, 35 should be slightly wider than the sealing rings 30, 31, 32, since this will further enhance the lubrication effect.

What I claim and desire to secure by Letters Patent is:

1. A method of lubricating a pair of sealing rings mounted axially beside one another and together defining a pressure fluid distribution space between two machine elements arranged for rotation in relation to each other and about the axis of the sealing rings, comprising the steps of feeding a lubricant into the pressure fluid distribution space, axially displacing the sealing rings at intervals first towards each other and then away from each other by changing the fluid pressure in the pressure fluid distribution space, and deforming the sealing rings in an axial sense into a shape deviating from the shape of an annular body of rotation.

2. The method of claim 1, wherein the axial displacement of the sealing rings is effected by pulsation of the fluid pressure in the pressure fluid distribution space.

3. The method of claim 1, wherein the lubricant is fed into the pressure fluid distribution space together with the pressure fluid.

4. The method of claim 1, wherein the lubricant is fed into the pressure fluid distribution space as the pressure fluid.

5. The method of claim 1, wherein the sealing rings are deformed in an axial sense by pressing each of the sealing rings against respective undulated walls of the pressure fluid distribution space.

6. A method of lubricating three sealing rings mounted axially beside one another pairwise to define two pressure fluid distribution spaces between two machine elements arranged for rotation in relation to each other and about the axis of the sealing rings, comprising the steps of feeding a lubricant into the pressure fluid distribution spaces; simultaneously axially displacing the sealing rings of one sealing ring pair at intervals first towards each other and them away from each other and the sealing rings of the other sealing ring pair at intervals first away from each other and then towards each other by changing the fluid pressure in the pressure fluid distribution spaces; and deforming the sealing rings in an axial sense into a shape deviating from the shape of an annular body of rotation.

7. The method of claim 6, wherein the axial displacement of the sealing rings is effected by variation of the fluid pressure in the pressure fluid distribution spaces.

8. The method of claim 6, wherein the axial displacement of the sealing rings is effected by pulsation of the fluid pressure in the pressure fluid distribution spaces.

9. The method of claim 6, wherein the lubricant is fed into the pressure fluid distribution spaces together with the pressure fluid.

10. The method of claim 6, wherein the lubricant is fed into the pressure fluid distribution spaces as the pressure fluid.

11. The method of claim 6, wherein the sealing rings are deformed in an axial sense by pressing each of the sealing rings of each sealing ring pair against a respective undulated wall of the pressure fluid distribution space associated with that pair.

12. A pressure fluid distribution assembly comprising a pair of sealing rings disposed axially beside one another; two machine elements arranged for rotation in relation to each other and about the axis of said sealing rings, said sealing rings and said two machine elements together defining a pressure fluid distribution space; means defining pressure fluid channels in said two machine elements, said fluid channels opening into the pressure fluid distribution space; groove-defining wall means on one of said two machine elements, said wall means defining annular grooves for said sealing rings; means defining alternating recesses and projections on at least one side wall of each annular groove defined by said groove-defining wall means; means for feeding a lubricant into the pressure fluid distribution space; and means for axially displacing said sealing rings in the grooves defined by said groove-defining wall means to bring said sealing rings into contact with said recess- and projection-defining means by pressurization of the fluid pressure in the pressure fluid distribution space for deforming said sealing rings into a shape deviating from the shape of an annular body of rotation.

13. The assembly of claim 12, wherein said groove-defining wall means defines annular grooves wider than said sealing rings.

14. The assembly of claim 12, wherein said means for axially displacing said sealing rings comprises means for varying the fluid pressure in the fluid distribution space.

15. A pressure fluid distribution assembly comprising three sealing rings disposed axially beside one another; two machine elements arranged for rotation in relation to each other and about the axis of said sealing rings, said sealing rings pairwise and together with said two machine elements defining two pressure fluid distribution spaces; means defining pressure fluid channels in said two machine elements, at least one fluid channel in each of said two machine elements opening in each pressure fluid distribution space; groove-defining wall means on one of said two machine elements, said wall means defining annular grooves for said sealing rings; means defining alternating recesses and projections on at least one side wall of each annular groove defined by said groove-defining wall means; means for feeding a lubricant into the pressure fluid distribution space; and means for axially displacing said sealing rings in the grooves defined by said groove-defining wall means by pressurization of the respective fluid distribution spaces to bring said sealing rings into contact with said recess- and projection-defining means for deforming said sealing rings into a shape deviating from the shape of an annular body of rotation.

16. The assembly of claim 15, wherein said groove-defining wall means defines annular grooves wider than said sealing rings.

17. The assembly of claim 15, wherein said means for axially displacing said sealing rings comprises means for varying the fluid pressure in the fluid distribution spaces.

* * * * *